United States Patent Office 2,716,114
Patented Aug. 23, 1955

2,716,114

PROCESS FOR THE PRODUCTION OF CAPROLACTAM

Bruno Blaser, Dusseldorf-Holthausen, and Günther Tischbirek, Dusseldorf-Benrath, Germany, assignors to Henkel & Cie., G. m. b. H., Dusseldorf-Holthausen, Germany, a limited liability company of Germany No Drawing. Application August 4, 1951, Serial No. 240,441

Claims priority, application Germany May 16, 1951

7 Claims. (Cl. 260—239.3)

This invention relates to the preparation of caprolactam from cyclohexanonoxime.

Caprolactam is commonly prepared from cyclohexanonoxime by reaction with sulphuric acid. However the product so obtained has an objectionable color and other impurities which are very difficult to remove.

In accordance with this invention caprolactam is prepared by reacting cyclohexanonoxime with sulfur trioxide in the presence of liquid sulfur dioxide or carbon bisulphide. By using this novel method substantially equal amounts of reactants are dissolved and reacted in the presence of liquid sulfur dioxide or liquid carbon bisulphide.

Greater dilution of the reactants reduces the violence of the reaction between cyclohexanonoxime and sulfur trioxide, but has its drawbacks, such as dilution of the final product, i. e. caprolactam. An optimum ratio of solvent to reactants is the one best suited for commercial purposes.

For continuous operation each of the reactants may be separately dissolved in a specific solvent, i. e. liquid sulfur dioxide or carbon bisulphide, and then reacted by bringing these two dissolved reactants together.

Elimination of the heat of reaction is a very important consideration, and if small amounts of reactants are employed this heat may be eliminated by cooling the outside surface of the reaction flask. For large scale operation the cooling of the reactants may be effected, for example, by passing the solutions through a cooler. However in this invention the heat of reaction may be effectively dispersed by evaporation of a proportionate amount of liquid sulfur dioxide or liquid carbon bisulphide, and at the same time effect satisfactory mixing of the reactants. The liquified and cooled solvent may be returned to the reaction vessel if desired.

After reaction the sulfur trioxide may be neutralized and the caprolactam extracted. The reaction is preferably conducted at about −30° C. since the product obtained at this temperature is substantially colorless and pure, requiring little if any further purification for use in, for example, the synthetic production of yarn.

In the case of carbon bisulphide the caprolactam is a solid insoluble in the said carbon bisulphide. In this situation, the caprolactam may be, for example, obtained as a sediment after decanting off the liquid present. When this solid caprolactam is melted it is substantially pure and had but a faint yellow color.

*Example I*

Twenty grams of sulfur trioxide were dissolved in fifty cubic centimeters (50 cc.) of liquid sulfur dioxide at −30° C. To this solution there was added a solution of 22 grams of cyclohexanonoxime dissolved in 50 cc. of liquid sulfur dioxide also at −30° C.

Upon the addition of the second solution the heat of reaction is dissipated by evaporation of sulfur dioxide. As the sulfur dioxide boils off the reaction mass becomes more viscous and crystals separate out therefrom on standing.

This mass of crystals was neutralized in the cold and then extracted with chloroform. The chloroform layer containing the dissolved caprolactam is water washed, dried, and then evaporated to remove the chloroform. The caprolactam so obtained is a colorless oil which promptly crystallizes on standing. It may be re-crystallized or distilled, if desired.

*Example II*

To a solution of 20 grams of sulfur trioxide dissolved in 100 cc. of liquid sulfur dioxide at −20° C. there is added with mixing 22 grams of finely pulverized cyclohexanonoxime. After this addition the liquid sulfur dioxide is evaporated or boiled off as in Example I and the reaction mass is further treated also as in Example I. The caprolactam obtained was of good yield and high purity.

*Example III*

Into an autoclave there was added a first solution of 20 grams of sulfur trioxide dissolved in 50 cc. of liquid sulfur dioxide and then a second solution of 22 grams of cyclohexanonoxime dissolved in 50 cc. of liquid sulfur dioxide. The reaction mass was mixed and the autoclave was externally cooled to remove the heat of reaction. The reaction product was neutralized with an alkaline compound in the cold and then extracted with chloroform. The extracted product has a slight color which on re-crystallization from ether had a melting point of 68–69° C.

*Example IV*

Twenty-two grams of sulfur trioxide were dissolved in 100 cc. of dry carbon bisulphide. To this solution was added a solution of 24 grams of cyclohexanonoxime dissolved in 100 cc. of carbon bisulphide. The reaction flask is cooled externally by means of water at 10–15° C. The caprolactam is freed from excess liquid by decantation.

After neutralizing the crude sediment with a 30 per cent solution of sodium hydroxide, the caprolactam was extracted therefrom by use of chloroform solvent.

*Example V*

To a first solution of 47 grams of sulfur trioxide dissolved in 150 cc. of carbon bisulphide there was added a second solution of 55 grams of cyclohexanonoxime dissolved in 150 cc. of carbon bisulphide.

The reaction of temperature was held at 10–15° C. The reaction product was neutralized with 30 per cent caustic soda in the cold. To facilitate separation of the layers the temperature of the neutralized product was raised to 60° C. The watery lower layer is removed and the caprolactam layer is distilled under vacuum. The product had a boiling point of 116–120° C. at 3 mm. of mercury. It promptly crystallized at room temperature and was colorless even under ultraviolet light.

*Example VI*

To a first solution of 23 grams of sulfur trioxide dissolved in 100 cc. of carbon bisulphide at 0° C. there was added a second solution of 25 grams of cyclohexanonoxime also dissolved in 100 cc. of carbon bisulphide at 0° C.

The reaction product was treated as in Example I to yield pure caprolactam.

We claim:

1. The method of preparing caprolactam comprising reacting sulfur trioxide dissolved in liquid sulfur dioxide with cyclohexanonoxime also dissolved in liquid sulfur dioxide.

2. The method of claim 1 wherein the temperature of reaction is held low by evaporation of the liquid sulfur dioxide during reaction.

3. The method of claim 1 wherein the heat of reaction is maintained at a low temperature by means of external cooling of the reaction flask.

4. The method of preparing caprolactam comprising reacting sulfur trioxide dissolved in liquid carbon bisulphide with a solution of cyclohexanonoxime also dissolved in carbon bisulphide.

5. The method of claim 4 wherein the heat of reaction is dissipated by evaporation of the carbon bisulphide present.

6. The method of claim 4 wherein the heat of reaction is dissipated by external cooling of the reaction flask.

7. The method of producing caprolactam, which comprises reacting cyclohexanonoxime with sulfur trioxide in the presence of a solvent selected from the class consisting of sulfur dioxide and carbon bisulphide.

References Cited in the file of this patent

UNITED STATES PATENTS

| | | |
|---|---|---|
| Re. 22,548 | Brandt | Sept. 26, 1944 |
| 2,249,177 | Schlack | July 15, 1941 |
| 2,573,374 | Wichterle | Oct. 30, 1951 |

FOREIGN PATENTS

| | | |
|---|---|---|
| 894,102 | France | Mar. 6, 1944 |